United States Patent Office 2,743,157
Patented Apr. 24, 1956

2,743,157

RE-EXTRACTION OF URANIUM FROM ORGANIC SOLVENTS

French T. Hagemann, Chicago, Leonard I. Katzin, Plainfield, and Nison N. Hellman, Peoria, Ill., assignors to the United States of America as represented by the United States Atomic Energy Commission No Drawing. Application July 28, 1952, Serial No. 301,392

3 Claims. (Cl. 23—14.5)

This invention relates to solvent extraction processes and particularly those for recovery of uranium. More specifically, the instant invention is concerned with a recovery of uranium from organic solvent solutions.

It is an object of the instant invention to effect a substantial reduction in volume of uranium-containing solutions.

A further object of this invention is to provide a method for recovery of substantially uranium-free solvent which is suitable for reuse and recycling.

Other objects and advantages of the instant invention will be apparent upon examination of this specification.

We have discovered that the over-all efficiency of re-extraction processes for recovery of uranium from organic solutions is markedly improved by contacting the organic solvent extract solutions containing hexavalent uranium values with a reagent capable of forming a preferably aqueous soluble complex compound with uranium. The complexing agent for uranium is preferably added as an aqueous solution to the solvent extract containing uranium values, so that complexing and reextraction are effected in one step.

Suitable reagents for complexing uranium are those containing sulfate, phosphate, oxalate, and fluoride anions, and they may be added either in the form of their respective acids or as the alkali salts, such as the ammonium, sodium or potassium salts. The sulfate anion, preferably in the form of ammonium sulfate, was found to be the best complexing agent for uranium. The use of a complexing agent according to this invention reduces considerably the volume of aqueous solution necessary for the re-extraction of uranium. Saturated aqueous solutions of the complexing agents are preferably employed, because an especially small volume of the aqueous back-extractant may then be used. While, for instance, a twenty-fold reduction in volume is effected by employing a water strip without complexing agent for re-extraction of uranium from a solvent extract solution, a volume reduction of several hundred-fold is obtained when a 3 N ammonium sulfate solution is employed as the back-extraction or "stripping" solution.

While the complexing agent is advantageously added to the stripping medium, it may also be incorporated into the organic solution to be treated. The solutions of the complexing agents can be employed repeatedly to re-extract uranium from relatively large volumes of organic solvent after removal of the extracted uranium values by any known method.

The re-extraction process of this invention may be effected in either batch or countercurrent systems. The aqueous solution of the complexing anion is preferably employed as the disperse phase and the organic solution as the continuous phase. The volume ratios between the aqueous complexing agent-containing solution and the organic solution may vary widely; it suitably ranges, though, between 1:10 and 1:20. However, in batch operations for stripping uranium from organic solvent, uranium losses of only about 0.01 per cent are encountered when equal volumes of aqueous strip and organic solvent are employed.

In the extraction of uranium from the original aqueous solutions the solvents, and particularly ether and hexone, often co-extract substantial amounts of acid as well as uranium from the aqueous solution. The solvent entering the stripping column then consequently contains as much as 0.1 M or even 0.2 M acid, and this acid is also stripped from the solvent. This relatively concentrated acid acts as a salting-out agent and impairs the re-extraction of uranium. This has been overcome partially by using a volume ratio of aqueous to organic of about 1:1 so as to effect greater dilution of the solvent acid than that obtained where the aqueous:solvent ratio is 1:10. This, of course, decreases the degree of volume reduction obtainable and thus impairs one of the main objects of this invention.

However, we have found that the use of complexing anions according to this invention overrides the adverse effect of any re-extracted acid. This is another advantage attained by the process of this invention.

While the re-extraction of uranium values from organic solvents is satisfactory when effected at room temperature, higher temperatures improve the back-extraction; of course, the maximum temperature usable is limited by the volatility of the solvent.

The following example will serve to illustrate the operation of the process of the instant invention.

Example

An ethereal uranyl nitrate solution, obtained by extracting a nitric acid aqueous solution of irradiated thorium oxycarbonate with diethyl ether, was treated for re-extraction of the uranium by countercurrently contacting with an aqueous 3 N $(NH_4)_2SO_4$ solution.

This stripping solution was introduced into a semi-continuous batch column of 16 mm. inside diameter packed with ⅛ inch helices to a column height of 26 inches. A stopcock at the bottom of the column permitted drainage. Solvent and aqueous solutions were introduced under pressure in order to obviate the extra height necessary for gravity feed. The ether solution of uranyl nitrate flowed at a rate of 1200 ml./hr. in contact with the aqueous sulfate solution at a flow rate of 20 ml./hr. Recovery of uranium was 99.5 per cent.

In the semicontinuous batch recovery column, uranium was completely re-extracted from 15–25 liters of the ethereal feed with one contact with 70 ml. of the 3 N $(NH_4)_2SO_4$. The aqueous ammonium sulfate solution used for re-extraction in this instance had been made alkaline with sufficient ammonium hydroxide to precipitate uranium as ammonium uranate $(NH_4)_2U_2O_7$ and any thorium present as $Th(OH)_4$. The precipitate was centrifuged, washed, dissolved in nitric acid and reprecipitated to insure removal of any sulfate. The data following are results obtained on material which had been aged four months after irradiation.

| | Acid Concentration | Thorium Concentration | Alpha counts/ min./ml. | Geiger-Müller counts/ min./ml. |
|---|---|---|---|---|
| Feed | pH=1.4 | ca. 2.6 | 96,000 | 1.76×10⁹ |
| Raffinate | pH=1.9 | ca. 2.6 | 292 | |
| Ether effluent from extraction column | 0.0041 N | | 31,700 | 4,100 |
| Ether effluent from recovery column | 0.00026 N | | 158 | 2,400 |
| Product effluent from recovery column | | 1%[1] of $U^{233}$ | 1.9×10⁶ | 48,000 |

Uranium loss in extraction column ............................................ 0.46%
Uranium loss in recovery column ............................................. 0.50%
Thorium separation factor ................................................... 1.7×10⁸
Decontamination factor ...................................................... 8.1×10⁵

[1] Spectrographic analysis.

The foregoing example is included only for illustration of the process of the instant invention, the scope of said invention being limited only by the scope of the following claims.

What is claimed is:

1. A process of reducing the volume of aqueous medium required for the practically quantitative extraction of hexavalent uranium values from a diethyl ether solution with said aqueous medium, comprising dissolving a complexing agent selected from the group consisting of sulfate, phosphate, oxalate, and fluoride in water, contacting said diethyl ether solution with the aqueous solution of sadi complexing agent, and separating an aqueous uranium values-containing phase from uranium-depleted diethyl ether.

2. The process of claim 1 wherein the complexing agent is ammonium sulfate.

3. The process of claim 1 wherein the water is saturated with said complexing agent.

References Cited in the file of this patent

UNITED STATES PATENTS 2,227,833     Hixson et al. _____ Jan. 7, 1941

OTHER REFERENCES

Arden: Jour. of the Chem. Soc. (London) (1949), Suppl. No. 2, p. S–299.

Friedlander et al.: Introduction to Radiochemistry, pp. 250–251 (1949), John Wiley & Sons, New York.

Weil: Chromatographic Technology in Isotope Separation, Atomics, vol. 1, No. 17, pp. 345–356 (December 1950).